April 17, 1962 M. G. BEKKER 3,029,857
MULTIPLE CONCENTRIC CHAMBER TIRE
Filed May 3, 1961

INVENTOR.
MIECZYSLAW G. BEKKER
BY S. J. Rotondi, A. J. Dupont,
R. M. Lyon and N. J. Latker United States Patent Office 3,029,857
Patented Apr. 17, 1962

3,029,857
MULTIPLE CONCENTRIC CHAMBER TIRE
Mieczyslaw G. Bekker, 1136 Maryland,
Birmingham, Mich.
Filed May 3, 1961, Ser. No. 107,595
6 Claims. (Cl. 152—339)
(Granted under Title 35, U.S. Code (1952), sec. 266)

The invention described herein may be manufactured and used by or for the Government for governmental purposes without the payment to me of any royalty thereon.

This invention relates to an improved lateral support for a tire composed of two concentric annular chambers.

The stimulus for the present invention is based on my observation that multiple concentric annular chamber tires of the type disclosed by the United States patents to Gray, Merz, and Khalil, U.S. Patent Numbers 2,955,636; 2,925,845 and 2,618,308, respectively, are not stable on curves or slopes due to additional lateral forces which tend to bend them sideways and which may result in damage to the tire carcass.

In an endeavor to overcome this deficiency, I designed a metal ring attached to each side of the tire rim for restraining the lateral deformation of the tire. However, such use of the metal ring alone proved to be impractical in that the resulting friction between the metal rings and the tire leads to excessively wear of the latter.

The object of the present invention is to provide a novel, adequate, practical, lateral support for and with a tire composed of two or more concentric annular chambers.

More specifically, the object of this invention is to provide in or for use with a multiple concentric chamber tire construction to avoid deflection disadvantages thereto, a lateral support structure therefor having rigid means to restrain or prevent undesirable lateral deformable and also resilient means preventing undesirable friction by way of effecting a lubricating action between the rigid means and a surface of at least one of the multiple chambers, which resilient means may be in the form of a resilient hollow ring filled partially with air and a solid or liquid lubricant.

Further objects and advantages of the present invention will be apparent from the following description, reference being had to the accompanying drawing, wherein particular embodiments of the present invention by way of examples only are shown and in which.

Figure 2:
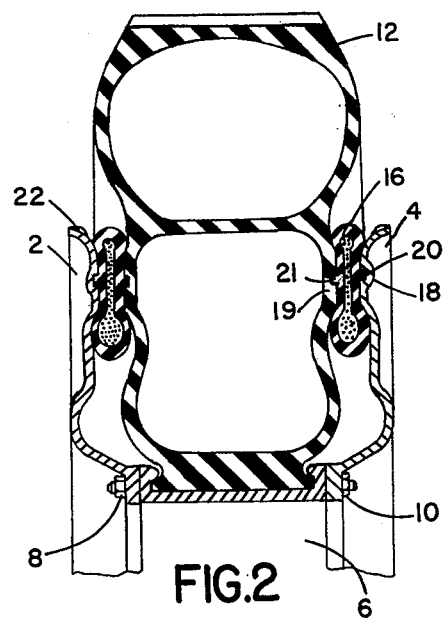
FIGURE 2 is a sectional elevation of the lubricating ring element of FIGURE 1 in combination with the lateral support feature on a multiple concentric chamber tire, in the absence of the tire deflecting forces.

Referring to FIGURE 2 of the drawing, metal rings 2, 4 are shown fastened to rim 6 by means of bolts 8, 10. Rim 6 carries a tire 12 composed of two concentric annular chambers. The specific details of the tire chamber construction are not described or shown since per se they are not considered part of the invention, and it is to be understood that this invention is not limited to use with a tire of two chambers but is to be considered equally useful with a tire of more than two chambers.

Figure 1:
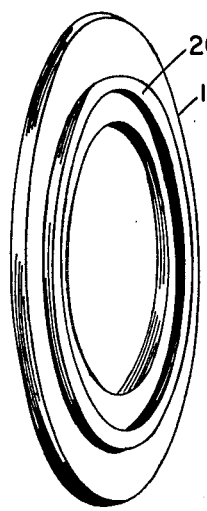
FIGURE 1 is a perspective view of my novel resilient lubricating effecting element in the form of a ring of the lateral support feature of my invention.
Figure 4:
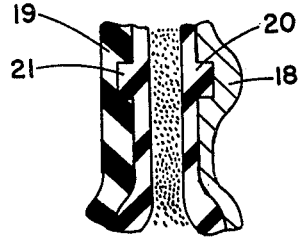
FIGURE 4 is an enlarged view of a portion of the lubricating ring element of FIGURE 2 showing details of the means securing the lubricating ring to the tire and the metal rings.

Lubricating ring 14, as shown in FIGURE 1, is interposed between metal rings 2, 4 and tire 12. The ring 14 is constructed of rubber or other elastic material and its hollow portion is filled with air and a solid or liquid lubricant, as illustrated by numeral 16. The ring 14 is shown in FIGURES 2 and 4 fastened to tire 12 and metal rings 2, 4 by tongues 20, 21 and grooves 18, 19, but it is understood that other means for securing the cooperating elements together which could be utilized would occur to those skilled in the tire art.

Metal rings 2, 4 are furnished with flanges 22 in order to provide a running surface in case of a blowout which running surface insures the carcass of tire 12 from severe injury. The flange 22 also serves to protect ring 14 from abuse.

Figure 3:
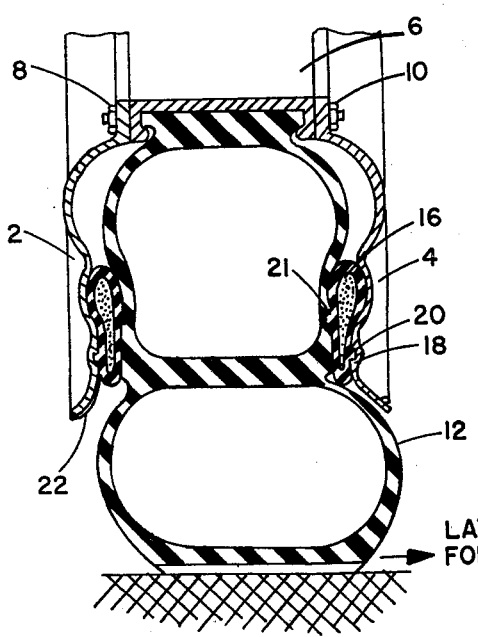
FIGURE 3 is a sectional elevation similar to that shown in FIGURE 2, but wherein the tire has undergone deflection due to acting lateral centrifugal forces.

FIGURE 3 of the drawing is a view of the tire and cooperating lateral support wherein the tire has deflected due to lateral forces initiated when traveling over a sloped or curved roadway. The deflection of the tire and interposed ring 14 is exaggerated in order to more clearly illustrate what is occurring. As tire 12 deflects under the load toward metal ring 4, the tongues 20, 21 integral with lubricating ring 14 move away from one another in a substantially vertical direction causing the internal surfaces of the ring 14 to rub against each other. Any friction that might occur between these surfaces is obviated by the interposed lubricate 16. Thus, it is clear my novel lubricating ring element of the lateral support eliminates contact between the rigid element of the lateral support and the tire and thus obviates all of the accompanying wear to the tire which otherwise would occur, while enabling the tire to deflect under load freely.

It is understood that various modifications may be apparent to those skilled in the art without departing from the spirit and scope of the invention, and the invention is not to be limited to the illustrated embodiments except as included in the appending claims.

I claim:

1. An elastic ring adapted to be interposed between a tire composed of concentric annular chambers and rigid lateral support rings, said elastic ring being hollow and containing a lubricant and having integral tongues adapted to mate with grooves formed on said tire and said rigid lateral support rings.

2. In a tire assembly, a tire composed of concentric annular chambers and lateral support means, said lateral support means including rigid means positioned at opposite sides of said tire and elastic lubricating means interposed between said rigid means and said tire.

3. The tire assembly as claimed in claim 2 wherein said rigid means are metal rings and said elastic lubricating means are hollow elastic rings containing a lubricant.

4. The tire assembly as claimed in claim 3 wherein the said hollow elastic rings are secured to said tire and metal rings by tongue and groove means.

5. In a tire assembly, a tire mounted on a tire rim and composed of concentric annular chambers and lateral support means, said lateral support means including two metal rings secured to said tire rim at opposite sides of said tire and elastic rings interposed between said metal rings and said tire, said elastic rings being hollow and containing lubricant.

6. The tire assembly as claimed in claim 4 wherein said elastic rings are secured to said tire and metal rings by tongue and groove means.

References Cited in the file of this patent

UNITED STATES PATENTS 2,924,876   Lewis _____ Feb. 16, 1960